G. A. MACBETH & H. A. SCHNELBACH.
GLASS BLOWING MACHINE.
APPLICATION FILED APR. 30, 1907.
929,456.
Patented July 27, 1909.
2 SHEETS—SHEET 2.
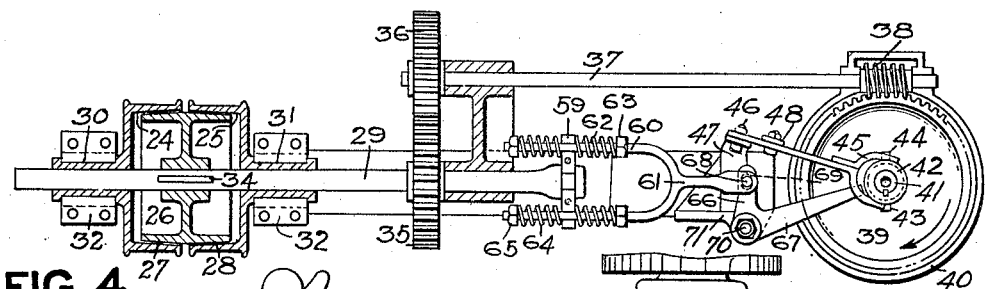
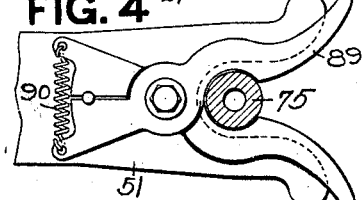
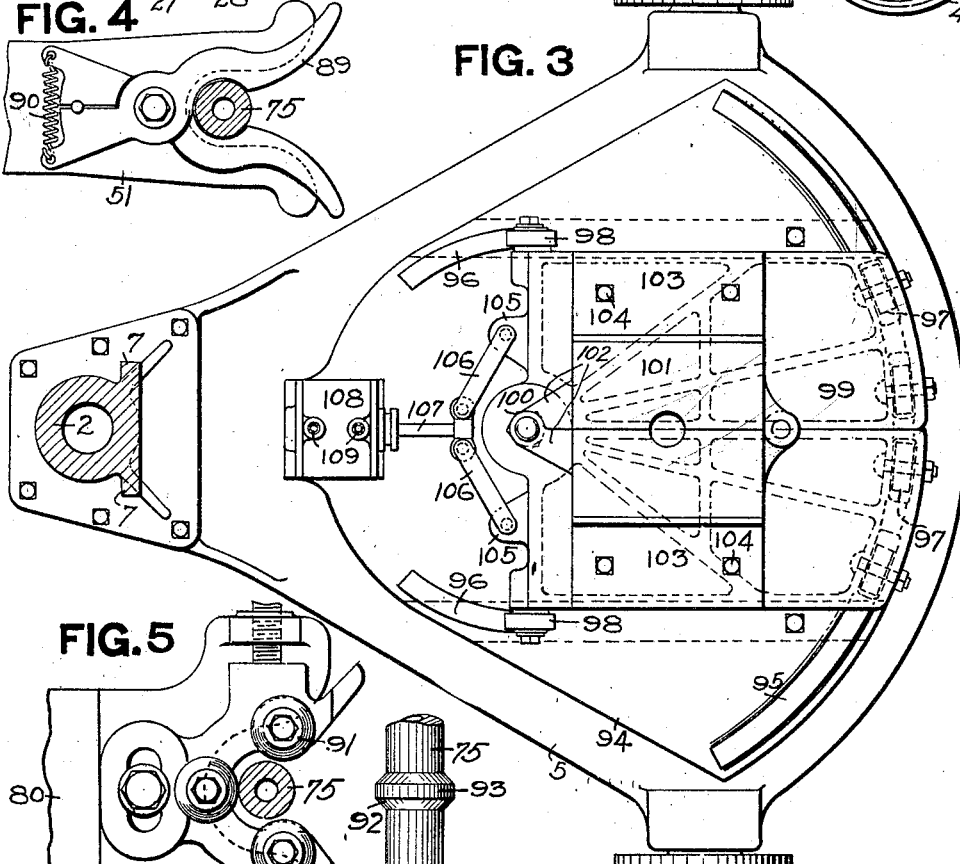
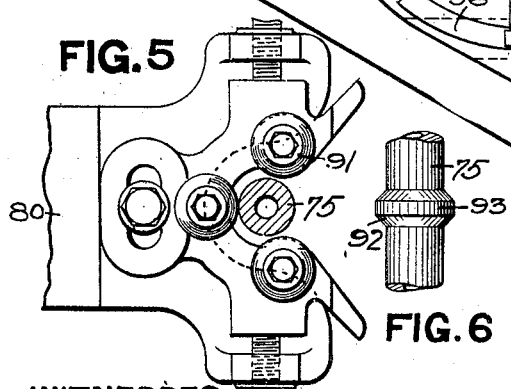
WITNESSES.
INVENTORS:

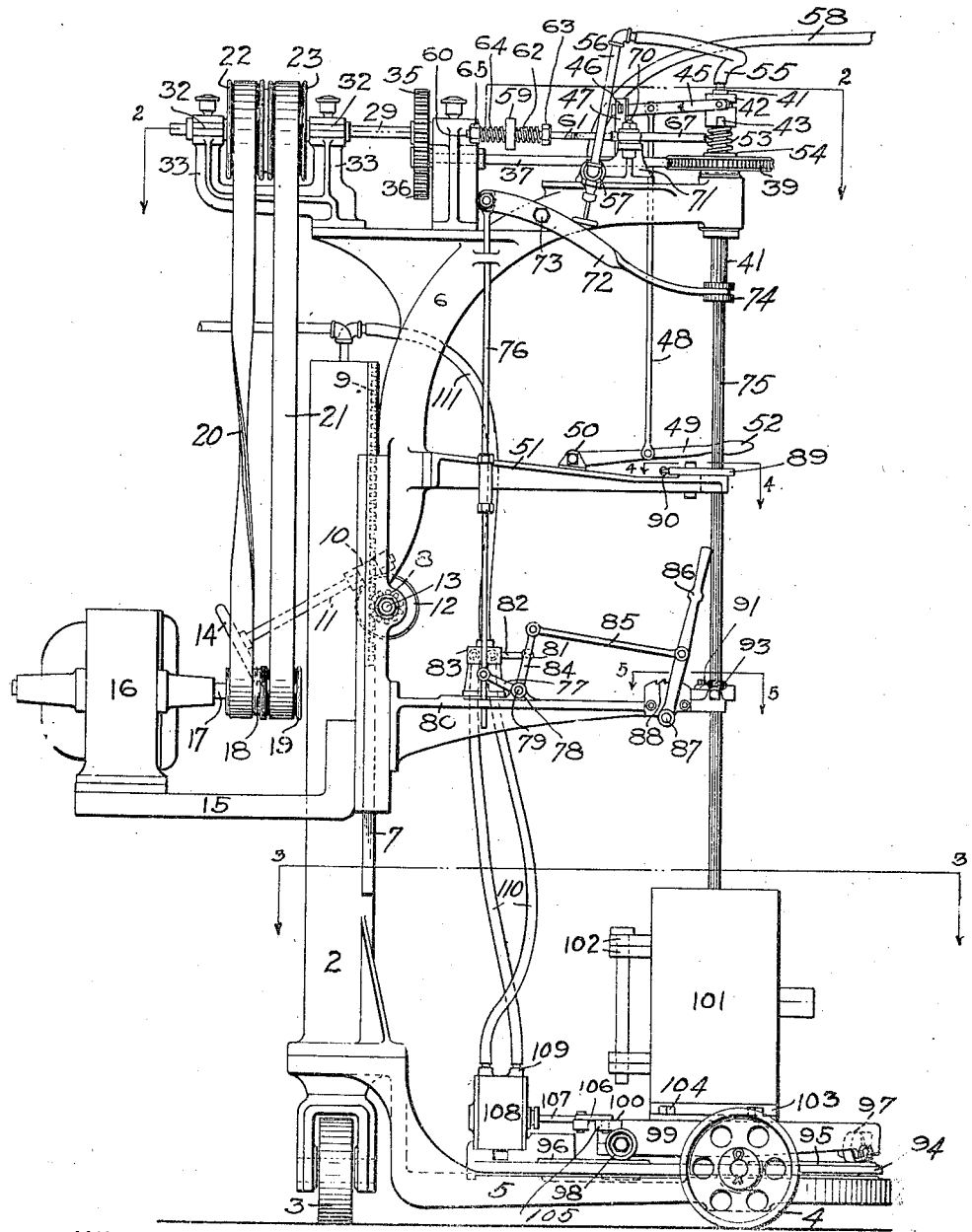

UNITED STATES PATENT OFFICE.

GEORGE A. MACBETH, OF PITTSBURG, AND HARRY A. SCHNELBACH, OF CRAFTON, PENNSYLVANIA, ASSIGNORS TO MACBETH-EVANS GLASS COMPANY, OF PITTSBURG, PENNSYLVANIA, A CORPORATION OF PENNSYLVANIA.

GLASS-BLOWING MACHINE.

No. 929,456.   Specification of Letters Patent.   Patented July 27, 1909.

Application filed April 30, 1907.   Serial No. 371,031.

*To all whom it may concern:*

Be it known that we, GEORGE A. MACBETH, a resident of Pittsburg, in the county of Allegheny and State of Pennsylvania, and HARRY A. SCHNELBACH, a resident of Crafton, county and State aforesaid, have invented a new and useful Improvement in Glass-Blowing Machines; and we do hereby declare the following to be a full, clear, and exact description thereof.

Our invention relates to apparatus for blowing articles of glass ware.

In the manufacture of articles of glass ware of any considerable size, such as electric outer arc globes, it is necessary during the blowing operation for the blower to reverse the direction of rotation of the blow pipe for the reason that if the rotation is all in one direction, owing to the size of the article, the upper or neck portion will be twisted and distorted so as to produce a defective piece of ware. As a consequence, these large articles of blown glass ware have hitherto been made by hand, as no machine had been devised by means of which the blow pipe could be automatically reversed so as to produce the same effect as when the blow pipe in the hand of the operator is reversed to produce a perfectly formed article.

One of the objects of our invention is to provide a machine for the manufacture of these larger sized articles in which direction of the rotation of the blow pipe may be reversed so as to form a perfectly shaped article without the twisting or distortion of the neck or upper portion of the same.

A further object of our invention is to provide means for readily closing or opening the mold without any effort on the part of the operator.

To these ends our invention comprises the novel features hereinafter set forth and claimed.

In the accompanying drawings, Figure 1 is a side elevation; Fig. 2 is a plan view partly in section, of the reversing mechanism; Fig. 3 is a horizontal section on the line 3—3, Fig. 1; Figs. 4, 5 and 6 are details of blow pipe supports.

Our invention has been applied to a common type of frame for glass blowing apparatus in which there is a pillar or standard 2 at the lower end of which is the roller 3. Projecting from said standard and supported by rollers 4, is the base or platform 5. Mounted upon the pillar 2 is the overhanging frame or bracket 6, said bracket being mounted in guides 7 on said pillar. Said overhanging frame 6 is adjustable up and down in said guides 7 by means of the pinion 8 on said frame engaging the rack 9 on said pillar 2. A worm 10 on the shaft 11 engages the worm wheel 12 on the shaft 13 carrying the pinion 8. A hand wheel 14 is provided for the worm shaft 11 and by turning said hand wheel, it is apparent that the frame 6 may be raised and lowered as desired for the articles of different height.

Supported on the shelf 15 of the frame 6 is a suitable motor 16 and on the motor shaft 17 are the pulleys 18 and 19. Belts 20 and 21 connect the pulleys 18 and 19 with the loose pulleys 22 and 23 respectively. The belt 20 is twisted so as to drive the pulley 22 in the opposite direction from the pulley 23. These pulleys 22 and 23 have the tapering inner faces 24 and 25 which form friction faces for the double-cone friction pulley 26 provided with correspondingly beveled or tapering faces 27 and 28. As stated, the pulleys 22 and 23 are loosely mounted on the shaft 29, said pulleys having the sleeves 30 and 31 which rest in bearings 32 in brackets 33. The friction pulley 26 is keyed to the shaft 29 by the key 34.

Rigidly secured to the shaft 29 is the gear wheel 35 which meshes with the gear wheel 36 on the counter shaft 37. A worm 38 on the shaft 37 meshes with the worm wheel 39. The worm 38 and worm wheel 29 are incased by the casing 40. The worm wheel 39 is keyed to the blow-pipe or hollow shaft 41. At the upper end of said shaft 41 is the collar 42 adapted to move up and down on said shaft and provided with the lugs 43 and 44 at opposite sides thereof. A forked arm 45 engages the collar 42, said arm being pivoted at 46 to the upright 47. A rod 48 is connected to the arm 45, the lower end of said rod being secured to the lever 49 pivoted at 50 to the support 51. The outer end of the lever 49 is provided with the handle 52.

A spring 53 is interposed between the collar 42 and the hub 54 of the worm wheel 39, the action of said spring to normally hold said collar 42 in its elevated position.

Connected to the upper end of the hollow shaft 41 is the hose or tubing 55, said tubing being connected up at its opposite end to the pipe 56 provided with the valve 57. A tube 58 is connected up to the valve 57, said tube 58 leading to a suitable air compressor by means of which air is supplied for the blowing operation as hereinafter set forth.

Secured to one end of the shaft 29 is the yoke 59 and through openings in said yoke pass the arms 60 of the bifurcated lever 61. Springs 62 are interposed between nuts 63 and the yoke 59, and springs 64 are interposed between said yoke and nuts 65 on the outer ends of the arm 60. The bifurcated lever 61 is pivotally secured to the arm 66 of the crank lever 67, the pivotal pin 68 engaging the elongated opening 69 in said arm 66 to allow for the proper play of the bifurcated lever 61. The crank lever 67 is pivoted at 70 to the bracket 71 on the frame 6 and the free end of said crank lever 67 is in the path of the lugs 43 and 44 of the collar 42 when said collar is lowered by the hand lever 49 as hereinafter set forth.

An arm 72 is pivoted to the frame 6 at 73, the outer end of said arm being forked and engaging the mouth piece 74 which is keyed to move up and down on the blow-pipe or hollow shaft 41. This mouth piece is of the ordinary form which is adapted to receive the upper end of the blow pipe proper 75 and which is adapted to form a tight connection between the hollow shaft 41 and said blow pipe while at the same time said mouth piece rotates with said blow pipe. The inner end of the arm 72 is connected to the rod 76 which is secured at its lower end to the arm 77 of the crank 78 pivoted at 79 to the shelf 80. Another arm 81 of the crank 78 is connected to the valve rod 82 which operates a suitable valve within the valve chamber 83 for the purpose hereinafter fully set forth.

An arm 84 is connected to the crank 78 and connected to said arm is the rod 85 connected to the lever 86. This lever 86 is pivoted at 87 and its movement is controlled by the stops 88.

Carried by the shelf 51 are the blow pipe holding arms 89 which are of the ordinary construction as illustrated in Fig. 4, connected at their inner ends by the spring 90. These arms are adapted to receive and hold the blow pipe in a vertical position during the blowing operation. A further support for the blow pipe during the blowing operation is provided at the outer end of the shelf 80. In this support are beveled idler rollers 91, which support the beveled face 92 of the enlargement 93 on the blow pipe. This is a common form of support and as no novelty is claimed for it, it needs no further description.

Secured to the base 5 is the plate 94, said plate having the curved guide way 95 along its front edge and the curved guide ways 96 at the rear thereof. Resting on the plate 94 with rollers 97 in the guide way 95 and rollers 98 in the guide ways 96 is the partible mold base 99. The parts of said mold base are pivoted at 100 so as to swing from that point. Secured to this partible mold base 99 is the mold 101, the parts of said mold being secured together by the hinge 102 in line with the pivot point 100 of the mold base. Each half of the mold 101 is secured to the corresponding half of the mold base by means of the flanges 103 secured to said mold base by the bolts 104. Pivoted to the lugs 105 on each half of the mold base are the links 106, the opposite ends of said links being connected to the piston rod 107 of the cylinder 108. Leading to opposite sides of the plunger of the fluid operated cylinder 108 are the inlets and outlets 109 and connected to said inlets and outlets are the flexible pipes 110 which are connected up to the valve 83. Leading to the valve 83 is the main supply tube 111. The valve 83 admits fluid to one or the other of the tubes 110 according to the movement of the lever 86 so as to supply fluid for opening and closing the mold.

When our improved apparatus is in use, the operator opens the mold by moving the lever 86 so as to admit fluid to the cylinder 108, whereupon said mold is opened, the partible mold base separating and the mold has carried thereby the rollers 97 and 98 traveling readily over the guide ways provided therefor and relieving the friction as well as the power necessary to effect the opening of the mold. With the mold in the open position the punty or blow pipe proper carrying the molten glass is inserted into position so as to bring the glass into proper position with reference to the mold. By the same movement of the lever 86 which opened the mold, the rod 76 is lowered and the outer end of the arm 72 lifted so as to raise the mouth piece 74 to permit of the upper end of the blow pipe being inserted within the mouth piece to form the connection between the hollow shaft 41 and said blow pipe. As soon as the blow pipe has been fixed in position in this manner with the molten glass within the mold and the blow pipe engaged by the arms 89 and resting on the rollers 91, the operator then throws the lever 86 in the opposite direction whereupon the fluid is directed to the opposite side of the cylinder 108 so as to close the mold while at the same time the mouth piece 74 is lowered onto the blow pipe to form the connection between the hollow shaft 41 and said blow pipe. With the blow pipe in this position and the mold closed air is then admitted to the blow pipe by turning the valve 57 to admit air through the pipe 55 to the upper end of said blow pipe. Assuming that the worm wheel 39 is rotating in the direction of the arrow, Fig. 2, it will be apparent that the blow pipe will be rotating in the same direction. In the manufacture of large articles of glass ware, such as outer arc light globes, it will be necessary to reverse the direction of rotation of the blow pipe from time to time to prevent the twisting and distorting of the glass in the mold. Accordingly, the operator with his hand upon the lever 49 forces down said lever and thereby draws down on the rod 48 which lowers the arm 45, carrying the collar 42. As said collar is lowered, the lugs 43 and 44 are brought into position to come in contact with the crank lever 67. When, therefore, said collar is lowered, the lug 43 will come in contact with the crank lever 67 and will act to move said lever so as to advance the bifurcated arm 61 and through it the shaft 29. This movement of the shaft 29 will throw the beveled face 27 of the friction pulley 26 into contact with the beveled face 25 of the pulley 22. This will act to reverse the direction of rotation of the shaft 29 and through the connections described will reverse the direction of rotation of the worm wheel 39 and consequently of the blow-pipe. The operator, with his hand upon the lever 49, can readily control the direction of rotation of the blow-pipe. Having reversed the direction of the worm wheel 39 from that indicated by the arrow in Fig. 2, the lug 44 will come around into engagement with the crank lever 67 and operate said crank lever so as to withdraw the frictional pulley from engagement with the pulley 24 and throw it into engagement with the pulley 25, whereupon said worm wheel will again rotate in the direction of the arrow in Fig. 2. As long, therefore, as the operator with his hand on the lever 49 holds the collar 42 down in position where the lugs 43 and 44 can come in contact with the crank lever 67, the reversal of the blow pipe will take place automatically. In this manner the reversal of direction of rotation of the blow pipe during the blowing operation prevents the twisting or distorting of the glass in the mold and the same results are obtained as in hand work where the blow pipe is reversed by the hand of the blower. The springs 62 and 64 offer sufficient resistance to provide for the movement of the shaft 29 when the crank lever 67 is moved, but as soon as the friction pulley has been thrown into engagement any further movement of the crank lever 67 is taken up by the said spring 62 and 64 so that danger of breakage of the parts is provided against. When the article of glass ware has been blown the operator raises the lever 49 and at the same time operates the lever 86 so as to throw up the mouth piece 74 and admit the air to the cylinder 108 to open the mold, whereupon the blow pipe can be removed together with the article of glass ware blown in the mold.

By having the mold mounted upon a partible mold base with friction rollers moving upon the plate 94, the power required to open the mold is greatly reduced while at the same time by applying the power in the manner indicated no exertion is required on the part of the operator to open the mold or close it other than the movement of the lever 86.

What we claim is:

1. In glass blowing apparatus, the combination of a suitable frame, of a mold, a blow pipe, means for supplying air thereto, a power driven shaft, connections between said shaft and said blow pipe to rotate the same, shaft reversing mechanism, and automatic means for operating said shaft reversing mechanism by the rotation of said blow pipe.

2. In glass blowing apparatus, the combination of a suitable frame, a mold, a blow-pipe, means for supplying air thereto, a power driven shaft, connections between said shaft and said blow-pipe to rotate the same, and means carried by the blow-pipe to trip the reversing mechanism.

3. In glass blowing apparatus, the combination of a suitable frame, a mold, a blow pipe, means for supplying air thereto, a longitudinally movable shaft, mechanism for reversing said shaft by the longitudinal movement thereof, connections between said shaft and said blow pipe, and means for longitudinally moving said shaft by the rotation of said blow pipe.

4. In glass blowing apparatus, the combination of a suitable frame, of a mold, a blow pipe, means for supplying air thereto, a longitudinally movable shaft, a double cone pulley on said shaft, frictional power pulleys oppositely driven, connections between said shaft and said blow pipe, and means for longitudinally moving said shaft to throw said double cone pulley automatically into engagement with one or the other of said pulleys.

5. In glass blowing apparatus, the combination of a suitable frame, a mold, a blow pipe, means for supplying air thereto, a longitudinally movable shaft, connections between said shaft and said blow pipe, a double cone pulley carried by said shaft, oppositely driven friction pulleys with which said cone pulley is adapted to be engaged, an arm, connections between said arm and said shaft, a collar carried by said blow pipe, projections on said collar and means for lowering said collar to bring said projections into contact with said arm to move said shaft, whereby said shaft is automatically reversed.

6. In glass blowing apparatus, the combination of a suitable frame, a mold, a blow pipe, means for supplying air thereto, a longitudinally movable shaft, a double friction cone carried by said shaft, oppositely driven frictional pulleys adapted to engage said cone, connections between said shaft and said blow pipe, an arm, connections between said arm and said shaft to move the same longitudinally, a spring actuated collar on said blow pipe having projections, and means for lowering said collar to bring said projections into engagement with said arm, whereby said shaft is automatically reversed.

7. In glass blowing apparatus, the combination of a suitable frame, a mold, a blow pipe, means for supplying air thereto, a longitudinally movable shaft, connections between said shaft and said blow pipe, a double cone on said shaft, oppositely driven frictional pulleys adapted to engage said cone, a yoke on said shaft, bifurcated arm engaging said yoke, springs on said arm at opposite sides of said yoke bearing against said yoke, and suitable abutments on said arm, a crank lever connected to said arm, and means for moving said crank lever in opposite directions by the rotation of said blow pipe.

8. In glass blowing apparatus, the combination of a suitable frame, a mold, a blow pipe, means for supplying air thereto, a driven shaft, a worm driven by said shaft, a worm wheel carried by said blow pipe with which said worm engages, and automatic mechanism for reversing the direction of rotation of said first named shaft by the rotation of said blow pipe.

9. In glass blowing apparatus, the combination of a suitable frame, a mold, a blow pipe, means for supplying air thereto, a movable collar carried by said blow pipe, a power driven shaft, connections between said shaft and said blow pipe, shaft reversing mechanism, and means for lowering said collar into engagement with said shaft reversing mechanism whereby said shaft reversing mechanism is operated automatically.

10. In glass blowing apparatus, the combination of a frame, a mold, a blow pipe, means for supplying air thereto, a movable collar carried by said blow pipe having projections thereon, a power driven shaft, connections between said shaft and said blow pipe, shaft reversing mechanism, and means for bringing said projections into engagement with said shaft reversing mechanism.

11. In glass blowing apparatus, the combination of a frame, a mold, a blow pipe, means for supplying air thereto, a movable reversing member carried by said blow pipe, a power driven shaft, connections between said shaft and blow pipe, shaft reversing mechanism, a lever and connections between said lever and said reversing member to bring same into engagement with said reversing mechanism.

12. In glass blowing apparatus, the combination of a suitable frame, a mold, a blow pipe, means for supplying air thereto, a movable reversing member carried by said blow pipe, a power driven shaft, connections between said shaft and said blow pipe, shaft reversing mechanism, and means for bringing said reversing member into engagement with said shaft reversing mechanism.

13. In glass blowing apparatus, the combination of a suitable frame, a partible mold, a hinged partible base plate on which said mold is mounted, and mechanism for opening and closing said partible base.

14. In glass blowing apparatus, the combination of a suitable frame, a partible mold, a hinged partible base plate on which said mold is mounted, a fluid cylinder, and connections between said fluid operated cylinder and said base to open and close the same.

15. In glass blowing apparatus, the combination of a suitable frame, a partible mold, a hinged partible base plate on which said mold is mounted, a platform, and frictional rollers on said partible base resting on said platform.

16. In glass blowing apparatus, the combination of a suitable frame, a partible mold, a partible base plate forming support for said mold, a platform having curved guide ways thereon, and rollers on said partible base plate engaging said guide ways.

17. In glass blowing apparatus, the combination of a frame, a partible mold, a partible base on which said mold is mounted, mechanism for opening and closing said partible base, a blow pipe, a movable mouth piece on said blow pipe, a lever, and connections between said lever and said mold opening and closing mechanism, and between said lever and said mouth piece, whereby said mechanism and said mouth piece are operated simultaneously.

In testimony whereof, we the said GEORGE A. MACBETH and HARRY A. SCHNELBACH have hereunto set our hands.

GEORGE A. MACBETH.
HARRY A SCHNELBACH

Witnesses:
ROBT. D. TOTTEN,
ROBERT C. TOTTEN